United States Patent [19]

Kikuchi et al.

[11] Patent Number: 5,081,544
[45] Date of Patent: Jan. 14, 1992

[54] OPTICAL SCANNING APPARATUS

[75] Inventors: Kazuo Kikuchi; Yoshifumi Homma, both of Hitachi, Japan

[73] Assignee: Hitachi, Ltd., Tokyo, Japan

[21] Appl. No.: 448,206

[22] Filed: Dec. 8, 1989

[30] Foreign Application Priority Data

Dec. 13, 1988 [JP]  Japan .................................. 63-312811

[51] Int. Cl.$^5$ .............................................. G02B 26/08
[52] U.S. Cl. ...................................... 359/212; 359/217; 250/236
[58] Field of Search ................ 350/6.5, 6.8, 6.7, 6.1, 350/619, 628; 250/234, 235, 236, 548; 358/481, 484, 209; 346/76 L

[56] References Cited

U.S. PATENT DOCUMENTS

| | | | |
|---|---|---|---|
| 3,973,825 | 8/1976 | Starkweather | 250/235 |
| 4,247,160 | 1/1981 | Brueggemann | 359/217 |
| 4,616,132 | 10/1986 | Kessler | 358/481 |
| 4,720,632 | 1/1988 | Kaneko | 250/235 |

FOREIGN PATENT DOCUMENTS

| | | |
|---|---|---|
| 57-68866 | 4/1982 | Japan . |
| 59-188615 | 10/1984 | Japan . |
| 61-172113 | 8/1986 | Japan . |
| 61-175611 | 8/1986 | Japan . |

*Primary Examiner*—Loha Ben
*Attorney, Agent, or Firm*—Antonelli, Terry, Stout & Kraus

[57] ABSTRACT

An optical scanning apparatus includes a light source, an image forming optical unit, a deflection unit and an optical beam detection unit provided inside a deflection area of the optical beam, the optical beam detection unit receiving the optical beam and generating a synchronizing signal. The optical beam detecting unit includes a unidirectional converging optical unit. This unidirectional converging optical unit is provided on an optical path of the optical beam irradiating the scanned surface for further converging the optical beam in a direction perpendicular to the direction of scanning in addition to the convergence performed by the image forming optical unit, so that the optical beam irradiating a light receiving surface of the optical beam detection unit can be focused in advance of the light-receiving surface of the optical beam detection unit in the above direction. In consequence, the allowable range of a shift of the scanning path of the optical beam caused by the manufacturing errors of the deflection unit and of a shift of an optical axis caused by the fine adjustment errors or strains of the supporting members can be increased. It is thus possible to provide an optical beam scanning apparatus which has a simple configuration and which enables the accuracy with which the position of the optical beam is detected to be improved.

10 Claims, 7 Drawing Sheets

OPTICAL SCANNING APPARATUS

BACKGROUND OF THE INVENTION

1. Field of the Invention

The present invention relates to an optical scanning apparatus for scanning a surface to be scanned by a spot of a beam of light focused on that surface by deflecting that spot, and more particularly, to an optical scanning apparatus of the type in which the scanning position of the spot of the light beam is detected to generate a synchronizing signal for scanning.

2. Description of the Related Art

Optical scanning apparatus for scanning a surface to be scanned by the spot of a beam of light focused on that surface by deflecting the beam of light are for use in a recording or reading apparatus.

The optical scanning apparatus for use in a light beam printer, such as a laser beam printer, incorporates a light beam detection unit for detecting the scanning position of the spot of the light so as to allow the generation of the beam of light to be modified in response to image information to be recorded. In this light beam detection unit, a light-receiving surface of a photoelectric conversion device is generally disposed inside a deflection area of the light beam and outside a recording area, and a beam of light irradiating this light-receiving surface is photoelectrically converted to generate a synchronizing signal.

Figure 10:
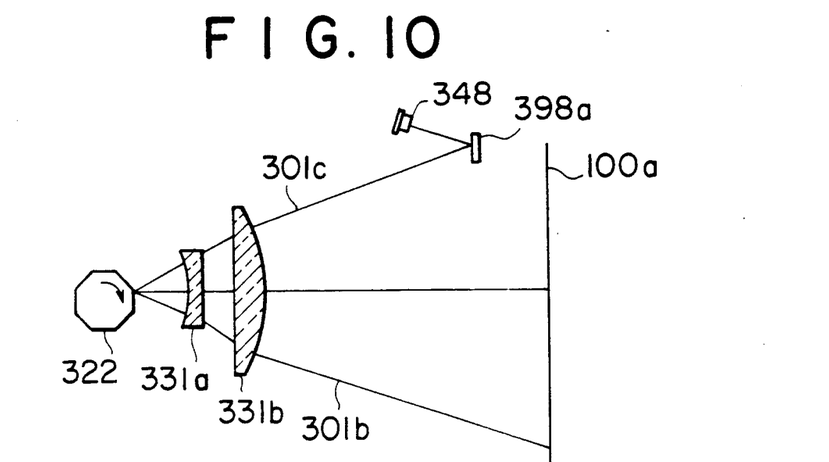
FIG. 10 shows an optical system incorporated in a conventional optical scanning apparatus.

FIG. 10 shows a conventional optical scanning apparatus. A beam of light emitted from a light source (not shown) is deflected by a polygonal mirror 322 which is rotated at a fixed speed to create a beam of light 301b, and this deflected beam of light 301b is focused on a surface 100a to be scanned by an image forming optical system which consists of image forming lenses 331a and 331b having fθ characteristics so as to form a spot of light. The surface to be scanned 100a is scanned by this light spot. A beam of light 301c which is deflected to the outside of the recording area is reflected by a plane mirror 398a when it reaches a predetermined synchronizing position and then received by a light-receiving surface of a photodiode 348 which is used as the photoelectric conversion device. The photodiode 348 converts this beam of light into an electrical signal and generates a synchronizing signal.

For the purpose of improving the accuracy of detection, the light-receiving surface of the photodiode generally has a small area, and the beam of light is focused for a small, sharp spot. Thus, inaccurate alignment of the light spot on the light-receiving surface causes a reduction in the detection accuracy or disability of detection. A first cause of these problems may be a facet error of the polygonal mirror 322. If any of specular surfaces of the polygonal mirror 322 is inclined with respect to the rotation axis thereof due to the manufacturing errors, the beam of light deflected (reflected) by the associated specular surface varies in a direction perpendicular to the direction of scanning, causing a shift of the scanning path of the beam of light with respect to the center of the light-receiving surface and thereby making it impossible for the beam of light to be received on the light-receiving surface precisely. The second cause of the problems is a shift of an optical axis due to the errors of installation of the light source, the image forming lenses 331a and 331b, the reflecting plane mirror 398a and the photodiode 348. Fine adjustment of these components is very difficult in a case where the beam of light is focused as a small, sharp spot and where the light-receiving surface of the photodiode 348 is small for high-precision. A shift of the optical axis also occurs due to the strains of a supporting member which is caused by shortage of the rigidity of the supporting member and the beam of light cannot therefore be received on the light-receiving surface precisely.

In order to solve the problems caused by the second cause, Japanese Patent Laid-Open No. 59-188615 proposes a method of expanding the beam of light 301c which is to be received on the light-receiving surface of the photodiode 348 by a cylindrical convex mirror in a direction perpendicular to the direction of scanning to form an elongated spot of light.

SUMMARY OF THE INVENTION

However, this method acts such that it enlarges a shift of the scanning path of the beam of light caused by a facet error of the polygonal mirror or a shift of the optical axis caused by the fine adjustment errors or the strains of the supporting member. In consequence, special consideration must be necessary in response to the enlargement of the action.

In the above-described conventional method, it is therefore required that the manufacturing errors and the adjustment errors be reduced, and that the rigidity of the supporting member be increased. These make it difficult to increase the detection accuracy.

An object of the present invention is to provide a light beam detection technique which has a simple configuration and which is capable of preventing a reduction in the light beam position detection accuracy caused by disability of the precise incidence of a beam of light on the light-receiving surface of a light beam detection unit without enlarging a shift of the scanning path of the light beam caused by the manufacturing errors of a deflection unit and a shift of an optical axis caused by the fine adjustment errors or the strains of a supporting member.

To this end, the present invention provides an optical scanning apparatus which includes a light source for generating a beam of light, an image forming optical unit for focusing the beam of light on a surface to be scanned and thereby forming a spot of light, a deflection unit for deflecting the beam of light and thereby moving the light spot along the surface to be scanned, and a light beam detection unit provided inside a deflection area of the beam of light, the light beam detection unit receiving the beam of light and generating a synchronizing signal and the light beam detection unit including a unidirectional converging optical device. This unidirectional converging optical device is provided on an optical path of the beam of light irradiating the surface to be scanned for further converging the beam of light in a direction perpendicular to the direction of scanning in addition to the convergence performed by the image forming optical unit, and this enables the beam of light irradiating a light-receiving surface of the light beam detection unit to be focused in advance of the light-receiving surface of the light beam detection unit in the direction perpendicular to the direction of scanning.

In the present invention, the optical beam which is to be received on the light-receiving surface of the light beam detection unit is focused in advance of the light-receiving surface in a direction perpendicular to the direction of scanning by the image forming unit and the converging device, and is therefore expanded and enlarged when it arrives at the light-receiving surface. In consequence, the allowable range of a shift of the scanning path of the light beam caused by manufacturing errors of the deflection unit and of a shift of the optical axis caused by fine adjustment errors and strains of the supporting members can be increased. Furthermore, since both units act such that they decrease a shift of the scanning path of the light beam by the deflection unit and a shift of the optical axis caused by the fine adjustment errors and the strains of the supporting members, the allowable range of the shift can be increased.

DETAILED DESCRIPTION OF THE INVENTION

Embodiments of the present invention will be described below with reference to the accompanying drawings.

Figure 13:
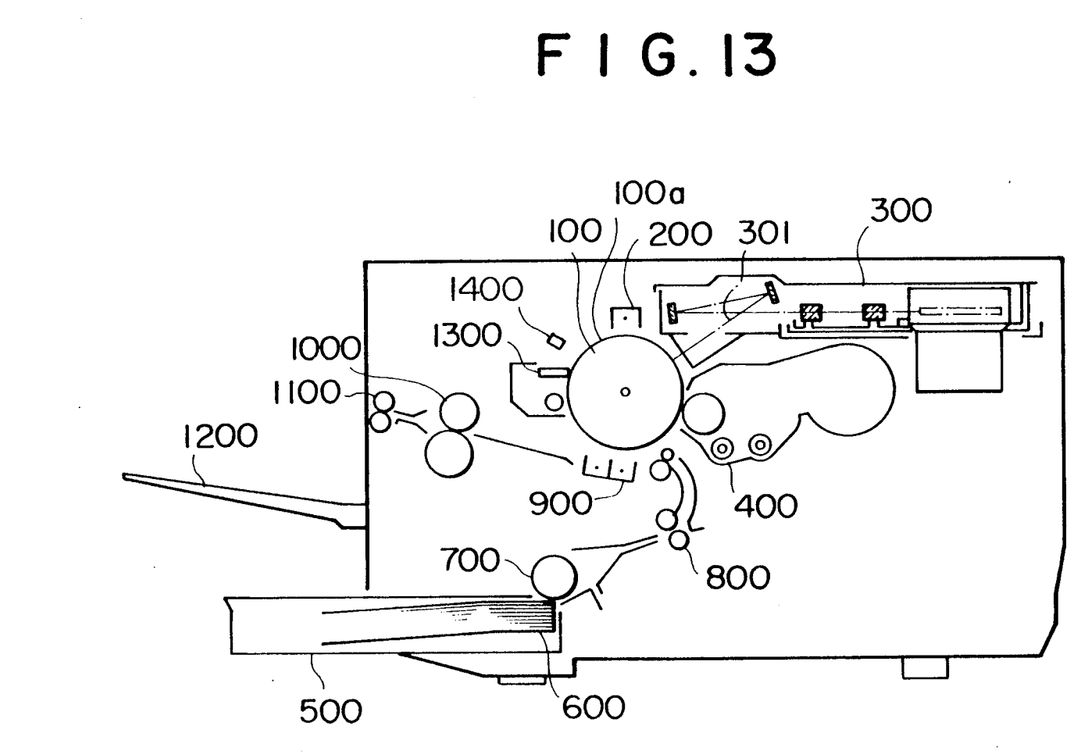
FIG. 13 is a vertical cross-sectional view of an optical printer to which the optical scanning apparatus according to the present invention is applied.

FIG. 13 is a vertical cross-sectional view of an optical printer to which an optical scanning apparatus according to the present invention is applied. A surface 100a of a photoconductive drum 100, which is rotated at a fixed speed by a power source (not shown), is charged uniformly by a charger 200, and then successively exposed for scanning through a spot of a beam of light 301 by means of an optical scanning apparatus 300 according to the present invention so as to form an electrostatic latent image. The electrostatic latent image thus formed is developed by a developer 400 to form a toner image. One of sheets of recording paper 600 accommodated in a paper cassette 500 is fed out of the cassette by a roller 700, and then sent to the photoconductive drum by register rollers 800 in a state where it is in register with the toner image formed on the surface 100a of the photoconductive drum. A transfer device 900 applies an electric field to the sheet of paper 600 from behind which is in contact with the surface 100a of the photoconductive drum by means of which the toner image on the surface 100a of the photoconductive drum is transferred onto the surface of the sheet of paper 600. The toner image transferred onto the sheet of paper 600 is fixed thereon when the sheet of paper subsequently passes through a heat fixer 1000. Thereafter, the sheet of paper 600 is discharged onto a discharge tray 1200 by discharge rollers 1100.

After the transfer of the toner image, toner remaining on the surface 100a of the photoconductive drum 100 from which the toner image has been transferred is removed by a cleaner 1300. Thereafter, the electrostatic latent image remaining on the surface 100a of the photoconductive drum is erased by an eraser 1400, by means of which the surface 100a of the photoconductive drum 100 is initialized. The surface 100a is then fed to the charger 200 again.

The optical scanning apparatus 300 must emit the beam of light 301 on which intensity modulation has been conducted on a precise position (on a position on the surface 100a of the photoconductive drum 100 which is to be exposed to the spot of beam of light 301, and which corresponds to a picture element) on the surface 100a of the photoconductive drum 100 in a synchronized state. In order to achieve this synchronization, the optical scanning apparatus 300 incorporates a light beam detection unit.

Figure 11:
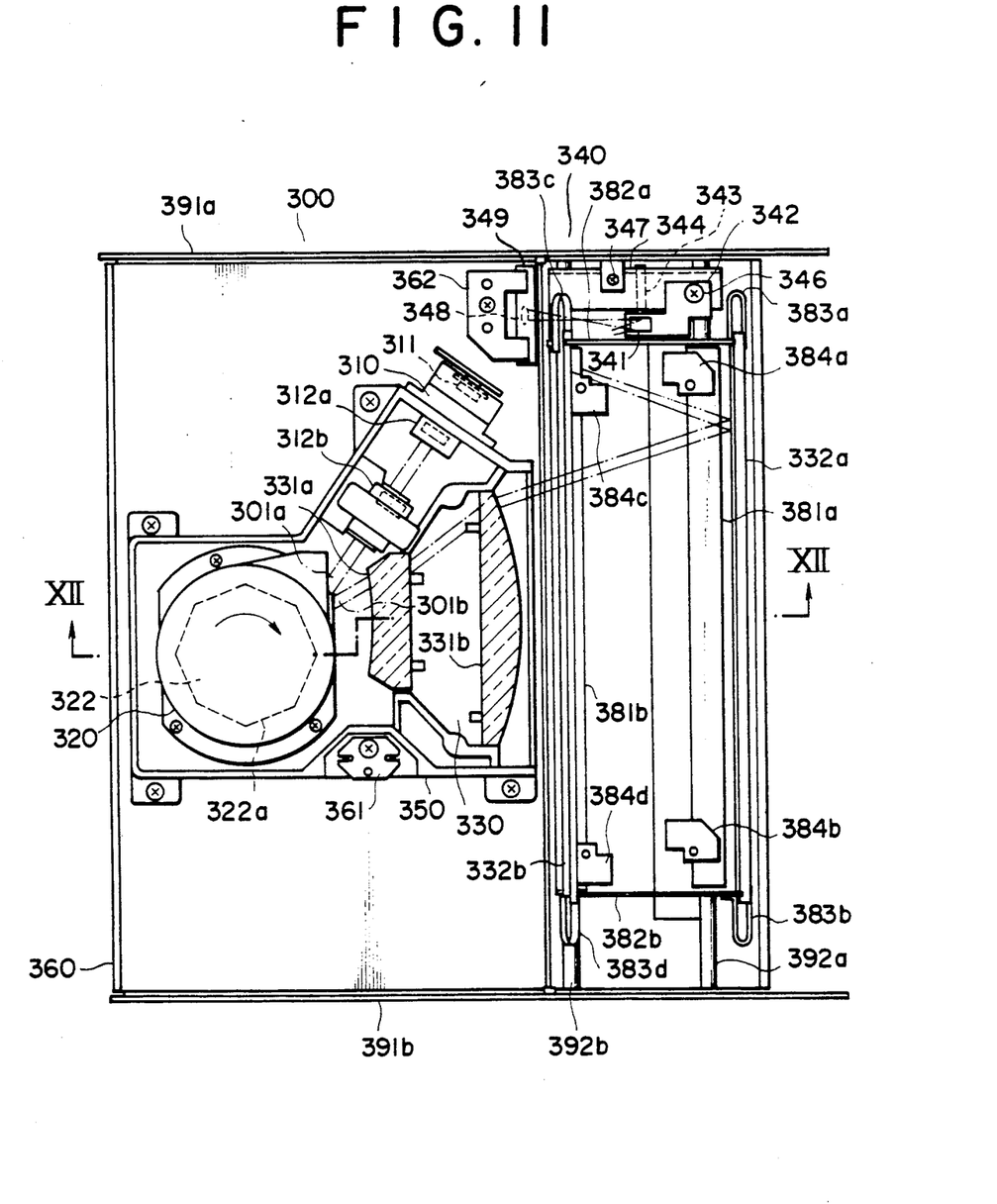
FIG. 11 is a plan view of an optical scanning apparatus according to the present invention.
Figure 12:
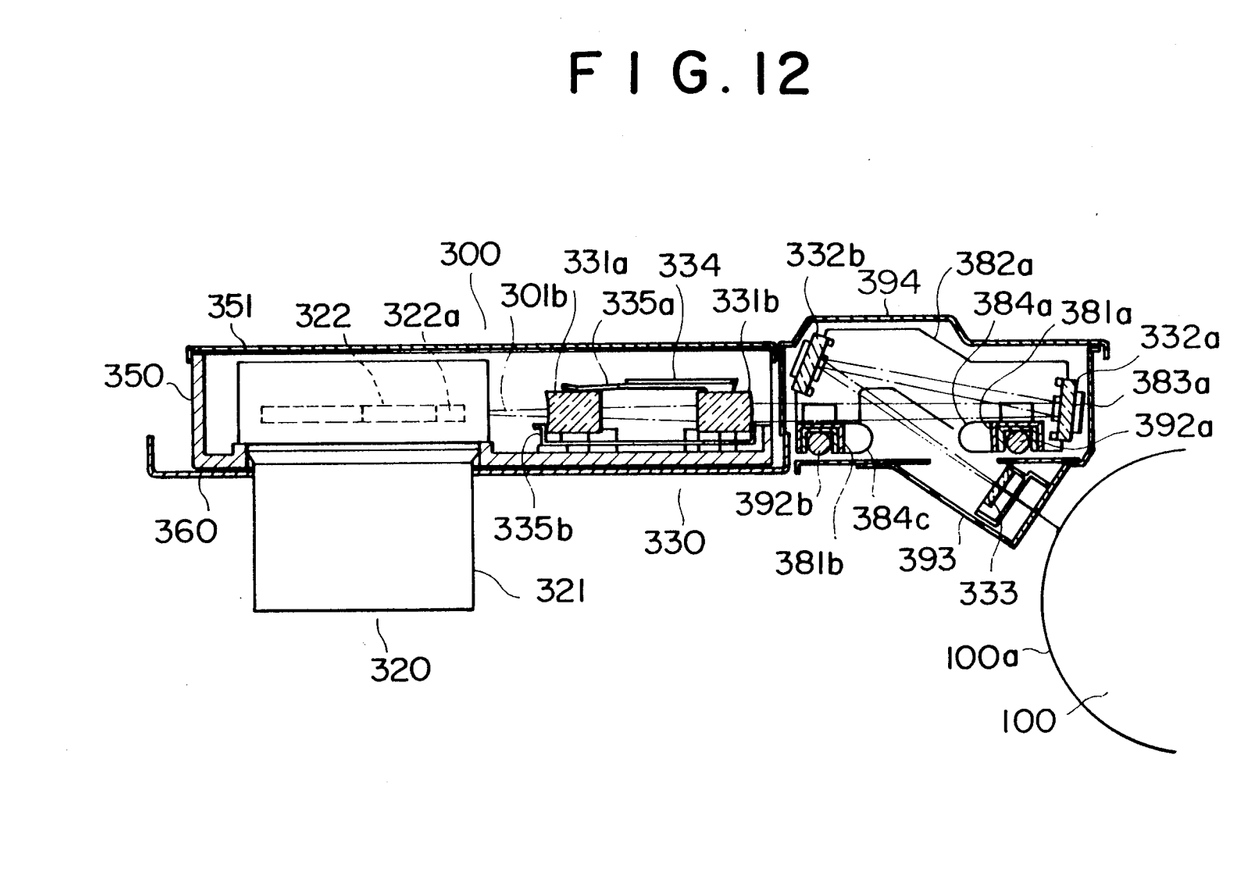
FIG. 12 is a section taken along the line XII—XII of FIG. 11.

The optical scanning apparatus 300 will be described in detail below with reference to FIGS. 11 and 12.

The optical scanning apparatus 300 includes a light source unit 310, a deflection unit 320, an image forming unit 330, a light beam detecting unit 340, an optical box 350 on which these components are mounted, and an optical base 360.

The light source unit 310 includes a laser diode 311 and a collimator lens 312a, which are accommodated in the optical box 350. The laser diode 311 whose operation is controlled in response to the information to be recorded emits a laser ray. The collimater lens 312a receives this laser ray and creates a laser beam (a light beam) 301a which is made up of parallel rays of light and whose intensity is modulated. Between the light source unit 310 and the deflection unit 320 is disposed a cylindrical lens 312b, which is held in such a manner that it can be adjusted in the direction of an optical axis and around the optical axis. The cylindrical lens 312b gathers the laser ray emitted from the laser diode 311 in a direction perpendicular to the direction of deflection and scanning and thereby focuses it on the reflecting surface of a polygonal mirror which is described later, by means of which the facet error of the polygonal mirror is corrected.

The deflection unit 320 includes the polygonal mirror 322 which is rotated at a fixed speed by a motor 321 mounted on the optical box 350. The polygonal mirror 322 has eight reflecting surfaces 322a which deflect the light beam 301a incident from the light source unit 310 for scanning repeatedly to create a deflected light beam 301b.

Figure 3:
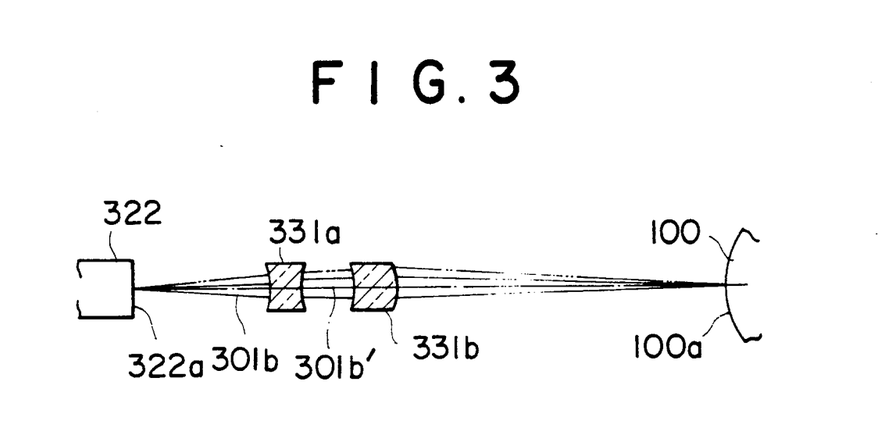
FIG. 3 explains the function of an image forming optical system.

The image forming unit 330 includes image forming lenses 331a and 331b having fθ characteristics, and plane mirrors 332a and 332b for elongating an optical path, and a dust protective glass 333. The image forming lenses 331a and 331b are accommodated in the optical box 350, whereas the plane mirrors 332a and 332b and the dust protective glass 333 are provided outside the optical box 350. The image forming lenses 331a and 331b are fixedly mounted at a predetermined degree of accuracy in the optical box 350 by means of a lens pressing member 334 and springs 335a and 335b. As shown in FIG. 3, the image forming lenses 331a and 331b receive the light beam 301b reflected by one of the reflecting surfaces 322a of the polygonal mirror 322 and focus it and thereby form a light spot on the surface 100a of the photoconductive drum 100. In that case, as described above, the light beam 301a which is incident on one of the reflecting surfaces 322a of the polygonal mirror 322 from the light source 310 is gathered in a direction perpendicular to the direction of scanning. In consequence the image forming point on each of the reflecting surfaces 322a of the polygonal mirror 322 and the image forming point on the photoconductive drum 100 are conjugate in the perpendicular direction, and this prevents a shift of the scanning line on the surface 100a of the photoconductive drum 100, which would occur when the optical axis of the light beam 301b is shifted from a reference optical axis 301b' due to the facet error of the associated reflecting surface 322a.

The plane mirrors 332a and 332b are mounted between mirror frames 382a and 382b connected with each other by stays 381a and 381b by means of pressing springs 383a to 383d in such a manner that they maintain predetermined positions and angles. The light beam 301b reflected by the plane mirror 332b passes through the dust protective glass 333 and images a light spot on the surface 100a of the photoconductive drum 100.

The optical box 350 is mounted on the optical base 360 while being fixed at a predetermined position by means of a positioning pin 361. The optical base 360 is mounted between body frames 391a and 391b. The mirror frames 382a and 382b are placed on shafts 392a and 392b extending between the body frames 391a and 391b and fixed thereto with the stays 381a and 381b being pressed against the shafts 392a and 392b by means of plate springs 384a to 384d.

The optical box 350 is covered by a cover 351 for dust prevention, whereas the plane mirrors 332a and 332b are covered by covers 393 and 394 for dust prevention.

Figure 1:
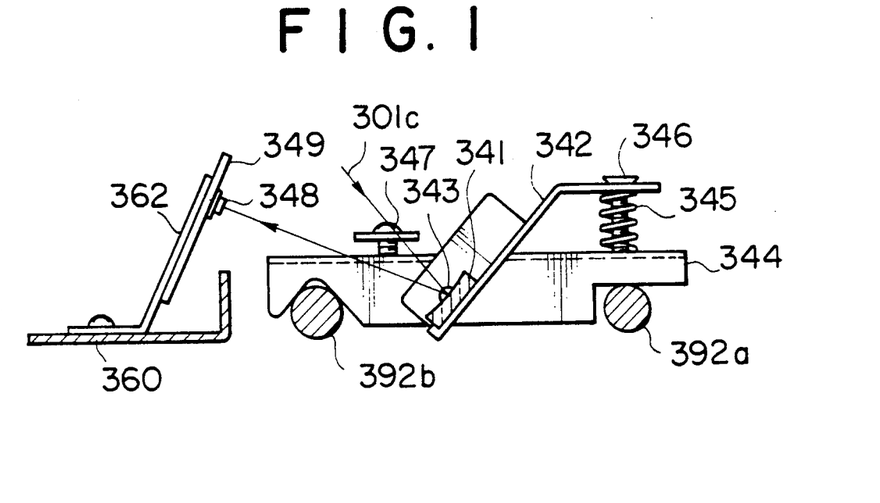
FIG. 1 is a vertical cross-sectional view of a light beam detection unit.

Next, the light beam detecting unit 340 which characterizes the present invention will be described below with reference to FIG. 1.

A cylindrical concave mirror 341 is mounted on a mirror holder 342. The mirror holder 342 is rotatably supported on a mirror base 344 by a pin 343 which is coaxial with respect to [the generating line of the cylindrical concave mirror 341. One end of the mirror holder 342 is fixed to one mirror base 344 by means of an adjusting screw 346 through which an adjusting spring 345 is being compressed between the end of the mirror holder 342 and the mirror base 344. The mirror base 344 is placed on the shafts 392a and 392b in a space formed by the mirror frame 382a, the body frame 391a, and the covers 393 and 394 and fixed to the body frame 391a by means of a fixing screw 347.

A photodiode 348 which is a photoelectric conversion device is mounted on a printed board 349, which is fixed to the optical base 360 by a mounting bracket 362. The light receiving surface of the photodiode 348 is located in a direction of deflection and scanning at a position to which the light beam 301b is deflected for detection of a synchronizing signal, as shown by a reference numeral 301c, and in the vicinity of the focal point of the cylindrical concave mirror 341. This position of the light receiving surface of the photodiode 348 is outside the image recording area of the photoconductive drum 100.

Figure 6:
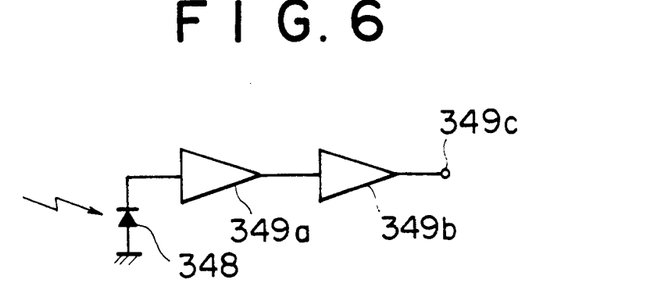
FIG. 6 is a circuit diagram of the light beam detection unit.

FIG. 6 shows an electric circuit incorporated in the light beam detecting unit 340. On the printed board 349 are provided an amplifier 349a for amplifying the output of the photodiode 348, and a comparator 349b for shaping the amplified signal and for outputting a synchronizing signal from its output terminal 349c.

When the photoconductive drum 100 is to be scanned, the thus-arranged optical scanning apparatus 300 according to the present invention is operated as follows: The light beam 301a emitted from the light source unit 310 is deflected by one of the reflecting surfaces 322a of the deflecting unit 320, as shown in FIG. 3, to create the deflected light beam 301b, and this deflected light beam 301b is focused for the spot on the surface 100a of the photoconductive drum 100 by the image forming unit 330. The surface 100a of the photoconductive drum 100 is exposed to and scanned by this light spot.

Figure 2A:
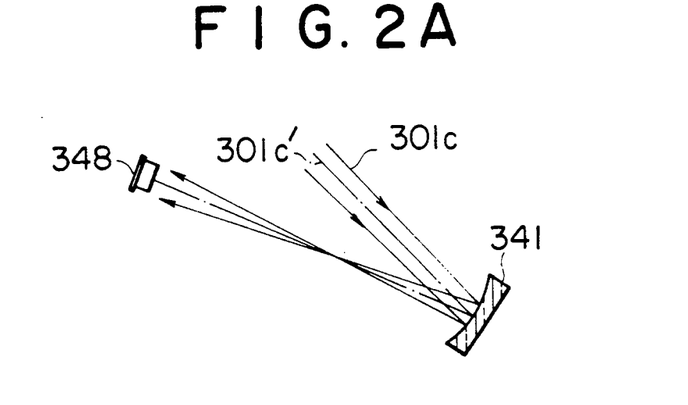
FIGS. 2A and 2B explain the function of a cylindrical concave mirror.

For the detection of the position of a light beam, the light beam 301c which is emitted from the image forming unit 330 is turned by the cylindrical concave mirror 341 and then received by the light receiving surface of the photodiode 348, as shown in FIG. 2A. Since this light beam 301c is further converged in a direction perpendicular to the direction of deflection by the cylindrical concave mirror 341, it is focused in advance of the light-receiving surface. The light beam 301c is expanded and is elongated in that direction when it arrives at the light-receiving surface.

Figure 4A:
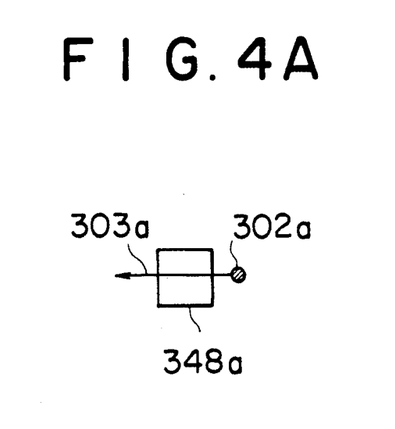
FIGS. 4A and 4B explain a relation between a light-receiving surface and a spot of light.
Figure 4B:
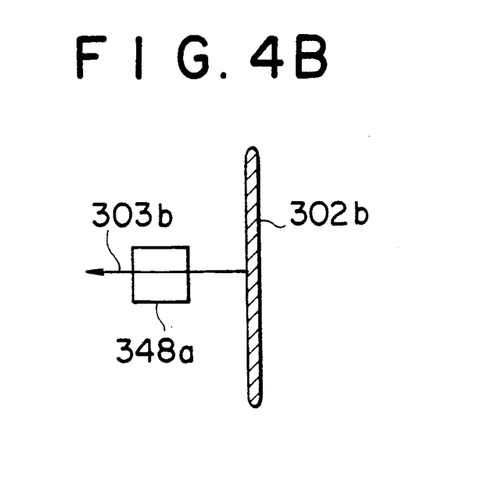
Figure 5:
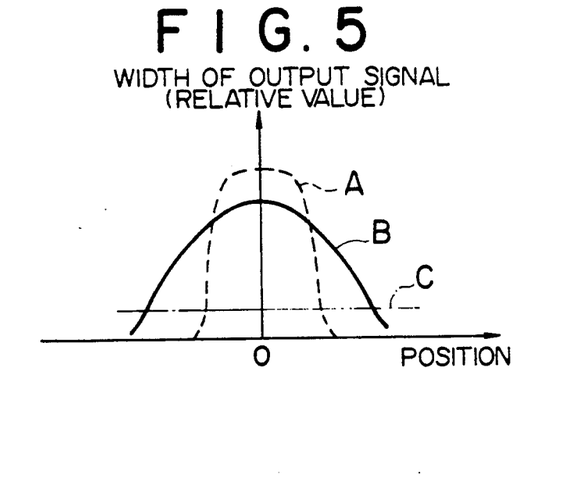
FIG. 5 is a graph, illustrating detection characteristics.

FIGS. 4A, 4B and 5 illustrate a relation between a cross-section (a light spot) of the light beam 301c which passes through a light-receiving surface 348a of the photodiode 348 and a signal which is output from the photodiode 348. In the conventional light beam detecting device, the light beam 301c is a circular spot of light 302a, as shown in FIG. 4A. In consequence, when a scanning path 303a represented by the center of the spot of light 302a deviates from the light-receiving surface 348a, the width of the resultant synchronizing signal decreases sharply, as shown by the broken line A in FIG. 5, causing detection failure. On the other hand, in the light beam detecting unit according to the present invention, since a spot of light 302b is elongated, as shown in FIG. 4B, even when a scanning path 303b represented by the center of the spot of light 302b deviates from the light-receiving surface 348a, the width of the resultant synchronizing signal does not decrease sharply, as shown by the solid line B in FIG. 5, resulting in an enlargement of a stably operated area. In FIG. 5, the axis of abscissa represents a shift of the optical axis of the light beam 301c with respect to the center of the light-receiving surface 348a which is generated by operating the adjusting screw 346 shown in FIG. 1, and the axis of ordinate represents the width of a synchronizing signal which is output from the comparator 349b. A level C indicates a stable level. This stably operated area is further enlarged by increasing the amplification factor of the amplifier 349a.

Figure 2B:
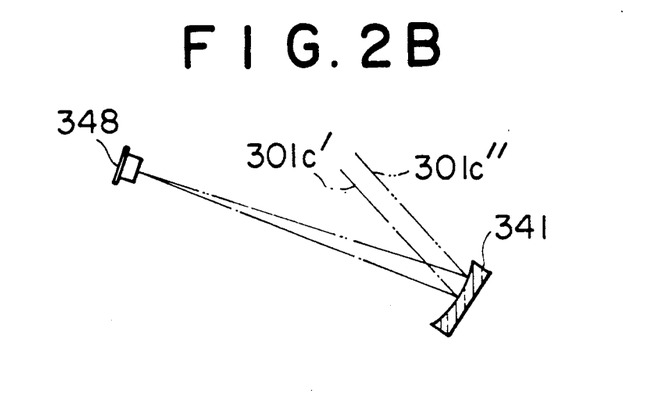

During the assembly, the angle of the cylindrical concave mirror 341 is adjusted by turning the adjusting screw 346 such that the optical axis 301c' of the light beam 301c passes through the center of the light-receiving surface. In this way, even when the optical axis 301c' of the light beam 301c shifts to form an optical axis 301c", as shown in FIG. 2B, the optical axis 301c" can be corrected such that it passes through the center of the light-receiving surface of the photodiode 348 which is located at the focal point of the cylindrical concave mirror 341, thus ensuring stable operation with respect to relative changes in the optical axis which will occur after the adjustment.

This embodiment employs the cylindrical concave mirror 341 in place of the plane mirror 398a which is employed in the conventional light beam detecting device, and is therefore inexpensive.

Figure 7:
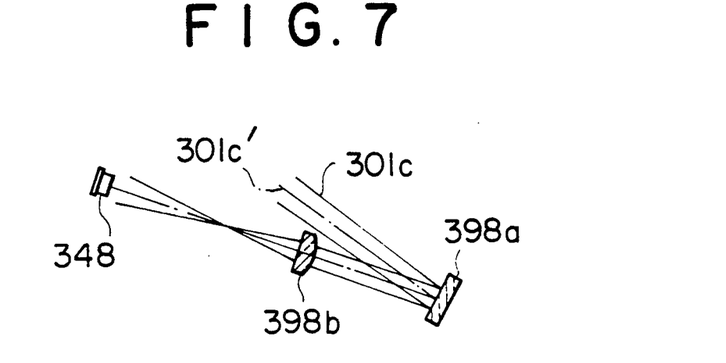
FIGS. 7 to 9 show modified examples of the light beam detection unit.

FIG. 7 shows a second embodiment of the present invention. In this embodiment, a plane mirror 398a and a cylindrical convex lens 398b are employed in the light beam detecting unit 340 in place of the cylindrical concave mirror 341. The cylindrical convex lens 398b is located between the plane mirror 398a and the light-receiving surface of the photodiode 348. This arrangement ensures the same effect as accomplished by the first embodiment. The cylindrical convex lens 398b may also be located in advance of the plane mirror 398a. In this embodiment, the light-receiving surface of the photodiode 348 is disposed at the focal point of the cylindrical convex lens 398b, and the optical axis 301c' of the light beam 301c is adjusted by rotating the plane mirror 398a.

Figure 8:
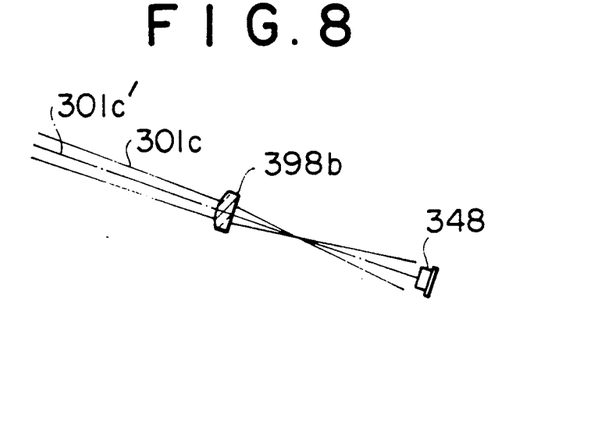

FIG. 8 shows a third embodiment of the present invention. In this embodiment, the cylindrical convex lens 398b is disposed in advance of the light-receiving surface of the photodiode 348 in place of the cylindrical concave mirror 341, so that the light beam is led to the photodiode 348 without being turned.

Figure 9:
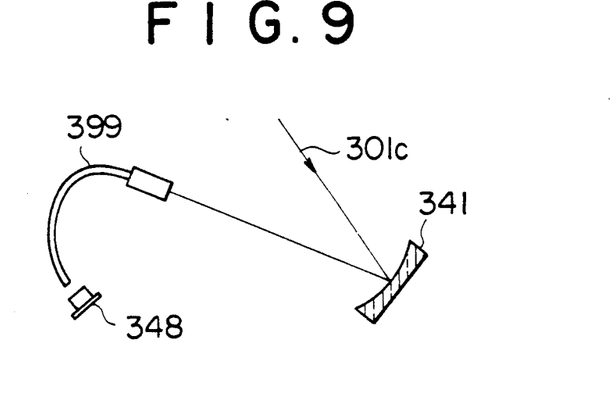

FIG. 9 shows a fourth embodiment of the present invention. In this embodiment, an incident end of an optical fiber 399 is disposed at the position of the light-receiving surface of the photodiode as described in the above embodiment. The light-receiving surface of the photodiode 348 is disposed at an emission end of the optical fiber 399, and the optical beam 301c incident on the incident end is led to the separately disposed photodiode 348. The optical system shown in FIG. 7 may be incorporated in this embodiment.

In this embodiment, the degree of freedom with which the photodiode 348 is disposed is increased.

As will be understood from the foregoing description, according to the present invention, the optical beam which is to be received on the light-receiving surface of the light beam detecting unit is focused in advance of the light-receiving surface in a direction perpendicular to the direction of scanning by the image forming unit and the converging unit, and is therefore expanded and enlarged when it arrives at the light-receiving surface. In consequence, the allowable range of a shift of the scanning path of the light beam caused by manufacturing errors of the deflection unit and of a shift of the optical axis caused by fine adjustment errors and strains of the supporting members can be increased. Furthermore, since both unit act such that they decrease a shift of the scanning path of the light beam by the deflection unit and a shift of the optical axis caused by the fine adjustment errors and the strains of the supporting members, the allowable range of the shift can be increased. It is thus possible to provide a light beam detecting device which has a simple configuration and which enables the accuracy with which the position of a light beam is detected to be improved.

What is claimed is:

1. An optical scanning apparatus including a light source for generating a beam of light, an image forming optical means for focusing said beam of light on a surface to be scanned and thereby forming a spot of light, a deflection means for deflecting said beam of light and thereby moving the light spot along the surface to be scanned, and a light beam detection means provided inside a deflection area of the beam of light, said light beam detection means receiving the beam of light and generating a synchronizing signal,
   wherein said light beam detection means includes a unidirectional converging optical means which is provided on an optical path of the beam of light irradiating the surface to be scanned for further converging the beam of light in a direction perpendicular to a direction of scanning in addition to a convergence performed by said image forming optical means, so that the beam of light irradiating a light-receiving surface of said light beam detection means is focused in advance of said light-receiving surface of said light beam detection means in said direction perpendicular to the direction of scanning.

2. An optical scanning apparatus according to claim 1, wherein said unidirectional converging optical means is provided such that said light-receiving surface of said light beam detection means is positioned substantially at a focal point of said unidirectional converging optical means.

3. An optical scanning apparatus according to claim 1, wherein said image forming optical means causes said deflection means and said surface to be scanned to be in a conjugate relation.

4. An optical scanning apparatus according to claim 1, wherein said unidirectional converging optical means is a concave mirror.

5. An optical scanning apparatus according to claim 4, wherein said concave mirror is a cylindrical concave mirror.

6. An optical scanning apparatus according to claim 4, wherein said concave mirror is rotatably supported by a support shaft which is coaxial with respect to a generating line of said concave mirror, and wherein said deflected beam of light is irradiated and reflected on and along said generating line.

7. An optical scanning apparatus according to claim 1, wherein said unidirectional converging optical means is a convex lens.

8. An optical scanning apparatus according to claim 7, wherein said convex lens is a cylindrical convex lens.

9. An optical scanning apparatus according to claim 1, wherein said light beam detection means includes an optical fiber whose incident end is disposed at the position of said light-receiving surface, and a photoelectric conversion device which is disposed at an emission end of said optical fiber.

10. An optical scanning apparatus including a light source for generating a beam of light, an image forming optical means for focusing said beam of light on a surface to be scanned and thereby forming a spot of light, a deflection means for deflecting said beam of light and thereby moving the light spot along the surface to be scanned, and a light beam detection means provided inside a deflection area of the beam of light, said light beam detection means receiving the beam of light and generating a synchronizing signal,
   wherein said image forming optical means has the function of correcting errors caused by a facet error of said deflection means, and wherein an optical means having a positive power in one direction is provided in an optical path which extends from said image forming optical means to said light beam detection means so that said light beam detection means can be covered by said beam of light which passes said light beam detection means even when a plane formed by the scanning of said beam of light varies in a direction perpendicular to said plane so that the beam of light irradiating a light-receiving surface of said light beam detection means is focused in advance of said light-receiving surface of said light beam detection means in said direction perpendicular to the direction of scanning.

* * * * *